US012067861B2

United States Patent

Moton, Jr. et al.

(10) Patent No.: US 12,067,861 B2

(45) Date of Patent: *Aug. 20, 2024

(54) SENSOR-BASED DETECTION OF VIOLATION OF PREMISES RULES AND IDENTIFICATION OF MAINTENANCE DEMANDS

(71) Applicant: AT&T Intellectual Property I, L.P., Atlanta, GA (US)

(72) Inventors: Robert T. Moton, Jr., Alpharetta, GA (US); Adrianne Binh Luu, Atlanta, GA (US); James Pratt, Round Rock, TX (US); Barrett Kreiner, Woodstock, GA (US); Walter Cooper Chastain, Atlanta, GA (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,953

(22) Filed: Apr. 17, 2023

(65) Prior Publication Data

US 2023/0252883 A1 Aug. 10, 2023

Related U.S. Application Data

(63) Continuation of application No. 17/348,396, filed on Jun. 15, 2021, now Pat. No. 11,631,318.

(51) Int. Cl.

*G08B 25/10* (2006.01)
*G08B 13/16* (2006.01)

(Continued)

(52) U.S. Cl.

CPC ......... *G08B 25/10* (2013.01); *G08B 13/1672* (2013.01); *G08B 13/2462* (2013.01); *G08B 21/182* (2013.01)

(58) Field of Classification Search

CPC .. G08B 25/10; G08B 13/1672; G08B 21/182; G08B 13/2462

See application file for complete search history.

(56) References Cited

U.S. PATENT DOCUMENTS 7,016,813 B2 * 3/2006 Alexander .......... H04L 63/0227 340/541
8,700,769 B2 * 4/2014 Alexander .............. H04L 41/18 709/224

(Continued)

OTHER PUBLICATIONS

Towel Tracker, from https://toweltracker.com/hotelsandresorts/, accessed on Jan. 31, 2021, 12 pages.

(Continued)

*Primary Examiner* — John A Tweel, Jr.

(57) ABSTRACT

A processing system including at least one processor may monitor a condition of a premises during a time period via at least one sensor, where at least one user is permitted a use of the premises during the time period, detect a change in the condition of the premises during the time period via the at least one sensor, determine a violation of at least one rule relating to the use of the premises by the at least one user, wherein the violation is indicated by the change in the condition, and generate an alert of the violation of the at least one rule relating to the use of the premises by the at least one user.

20 Claims, 6 Drawing Sheets

(51) Int. Cl.
*G08B 13/24* (2006.01)
*G08B 21/18* (2006.01)

(56) References Cited

U.S. PATENT DOCUMENTS

| | | | | |
|---|---|---|---|---|
| 9,466,189 | B2 * | 10/2016 | Patterson | G08B 13/00 |
| 9,717,352 | B2 | 8/2017 | Molewyk et al. | |
| 10,096,219 | B1 | 10/2018 | Maurer et al. | |
| 10,255,775 | B2 * | 4/2019 | Hui | G08B 13/19602 |
| 10,497,241 | B1 | 12/2019 | Maurer et al. | |
| 10,943,451 | B1 | 3/2021 | Maurer et al. | |
| 11,631,318 | B2 * | 4/2023 | Moton, Jr. | G08B 13/19602 340/539.13 |
| 2014/0197949 | A1 | 7/2014 | Shapiro et al. | |
| 2017/0124836 | A1 | 5/2017 | Chung et al. | |
| 2019/0364244 | A1 | 11/2019 | Siminoff et al. | |
| 2021/0104143 | A1 | 4/2021 | Gandrud et al. | |
| 2022/0058934 | A1 | 2/2022 | Pazmandy et al. | |
| 2022/0082430 | A1 | 3/2022 | Slavin et al. | |

OTHER PUBLICATIONS

Comcast Business Community, "Increased Adoption of Smart Technology by Hotels Requires Reliable, High-Speed Network" Oct. 29, 2021, from https://business.comcast.com/community/browse-all/details/increased-adoption-of-smart-technology-by-hotels-requires-reliable-high-speed-network, accessed on Jan. 31, 2021, 4 pages.
Sen Source Inc., "People Counters", from https://sensourceinc.com/ accessed on Jan. 31, 2021, 14 pages.
TRAF-SYS, "Space Occupancy & Space Utilization Hardware", from https://www.trafsys.com/space-utilization-hardware/ accessed on Jan. 31, 2021, 5 pages.

* cited by examiner

200

FIG. 2

AMENITY DATABASE 210

| AMENITY | ACCESS CHARGE | SENSOR ID | CURRENT STATE | RESET STATE |
| --- | --- | --- | --- | --- |
| BEDROOM 1 | $0 | XYZ123 | ACCESSED | CLOSED |
| BEDROOM 2 | $25 | XYZ123 | ACCESSED | CLOSED |
| BEDROOM 3 | $25 | XYZ124 | CLOSED | CLOSED |
| STOVE | $0 | XYZ125 | CLEAN | CLEAN |
| GRILL | $3 | XYZ125 | USED | CLEAN |
| WASHER | $5 | XYZ126 | USED | CLEAN |
| DRYER | $5 | XYZ127 | USED | CLEAN |
| SAUNA | $10 | XYZ128 | ACCESSED | CLOSED |
| HOT TUB | $10 | XYZ129 | USED | CLEAN |
| EXTRA PILLOWS AND BLANKETS | $7 | XYZ130 | CLEAN | CLEAN |

FIG. 3

PREMISES RULES DATABASE 300

| PREMISES RULE | SENSOR ID | RULE THRESHOLD | CURRENT STATE | RESET STATE | ACTION |
|---|---|---|---|---|---|
| MAXIMUM CAPACITY (PERSONS) | CAMERA XYZ, MICROPHONE ABC | 4 | 6 | 0 | ALERT, ADD TO USAGE REPORT |
| MAXIMUM CAPACITY (PETS) | CAMERA XYZ, MICROPHONE ABC | 0 | 1 | 0 | ALERT, ADD TO USAGE REPORT ADD MAINTENANCE DEMAND |
| MAXIMUM NOISE LEVEL (DNL) | MICROPHONE ABC | 80 dB | 55 dB | 50 dB | ALERT |
| NO SMOKING | AIR QUALITY SENSOR 123 | 200 PPM | 40 PPM | 0 PPM | ALERT, ADD TO USAGE REPORT ADD MAINTENANCE DEMAND |
| NO REMOVAL OF AMENITIES | SENSORS 8, 9, 10, 11, 12 | 0 | 1 | 0 | ALERT, LOCK IF DETECTED IN PROPER LOCATION |
| NO MOVEMENT OF FURNITURE | SENSORS 8, 9, 10, 11, 12 | 0 | 0 | 0 | ALERT |
| MAXIMUM TEMPERATURE | THERMOSTAT 789 | 75 F | 72 F | 70 F | RESET TO 70 F AND LOCK |

400

500

600

SENSOR-BASED DETECTION OF VIOLATION OF PREMISES RULES AND IDENTIFICATION OF MAINTENANCE DEMANDS

This application is a continuation of U.S. patent application Ser. No. 17/348,396, filed Jun. 15, 2021, now U.S. Pat. No. 11,631,318, which is herein incorporated by reference in its entirety.

The present disclosure relates generally to premises monitoring systems and more particularly to methods, computer-readable media, and apparatuses for determining a violation of at least one rule relating to the use of a premises by at least one user in response to a change in the condition of the premises detected via at least one sensor, and to methods, computer-readable media, and apparatuses for determining a maintenance demand of at least one feature of a premises from a change in a condition of the premises detected via at least one sensor.

BACKGROUND

A building management system (BMS) may monitor one or more different physical parameters relating to a building environment, including for example: temperature, humidity, atmospheric pressure, light level, sound level, and so forth. A BMS may include a number of sensors throughout a room, a building, or a group of several buildings. The sensors may also be connected to and managed by an aggregation panel that receives data generated by the sensors. There are numerous building management systems of different vendors and with different data formats.

SUMMARY

In one example, the present disclosure describes a method, non-transitory computer-readable medium, and apparatus for determining a violation of at least one rule relating to the use of a premises by at least one user in response to a change in the condition of the premises detected via at least one sensor. For instance, a processing system including at least one processor may monitor a condition of a premises during a time period via at least one sensor, where at least one user is permitted a use of the premises during the time period, detect a change in the condition of the premises during the time period via the at least one sensor, determine a violation of at least one rule relating to the use of the premises by the at least one user, where the violation is indicated by the change in the condition, and generate an alert of the violation of the at least one rule relating to the use of the premises by the at least one user.

In addition, in one example, the present disclosure describes a method, non-transitory computer-readable medium, and apparatus for determining a maintenance demand of at least one feature of a premises from a change in a condition of the premises detected via at least one sensor. For instance, a processing system including at least one processor may monitor a condition of a premises during a time period via at least one sensor, where at least one user is permitted a use of the premises during the time period, detect a change in the condition of the premises during the time period via the at least one sensor, determine, from the change in the condition of the premises, a maintenance demand of at least one feature of the premises, and generate a notification of the maintenance demand of the at least one feature of the premises.

BRIEF DESCRIPTION OF THE DRAWINGS

The teachings of the present disclosure can be readily understood by considering the following detailed description in conjunction with the accompanying drawings, in which:

FIG. 2 illustrates an example amenity database, in accordance with the present disclosure;

FIG. 3 illustrates an example premises rules database, in accordance with the present disclosure;

To facilitate understanding, identical reference numerals have been used, where possible, to designate identical elements that are common to the figures.

DETAILED DESCRIPTION

Figure 1:
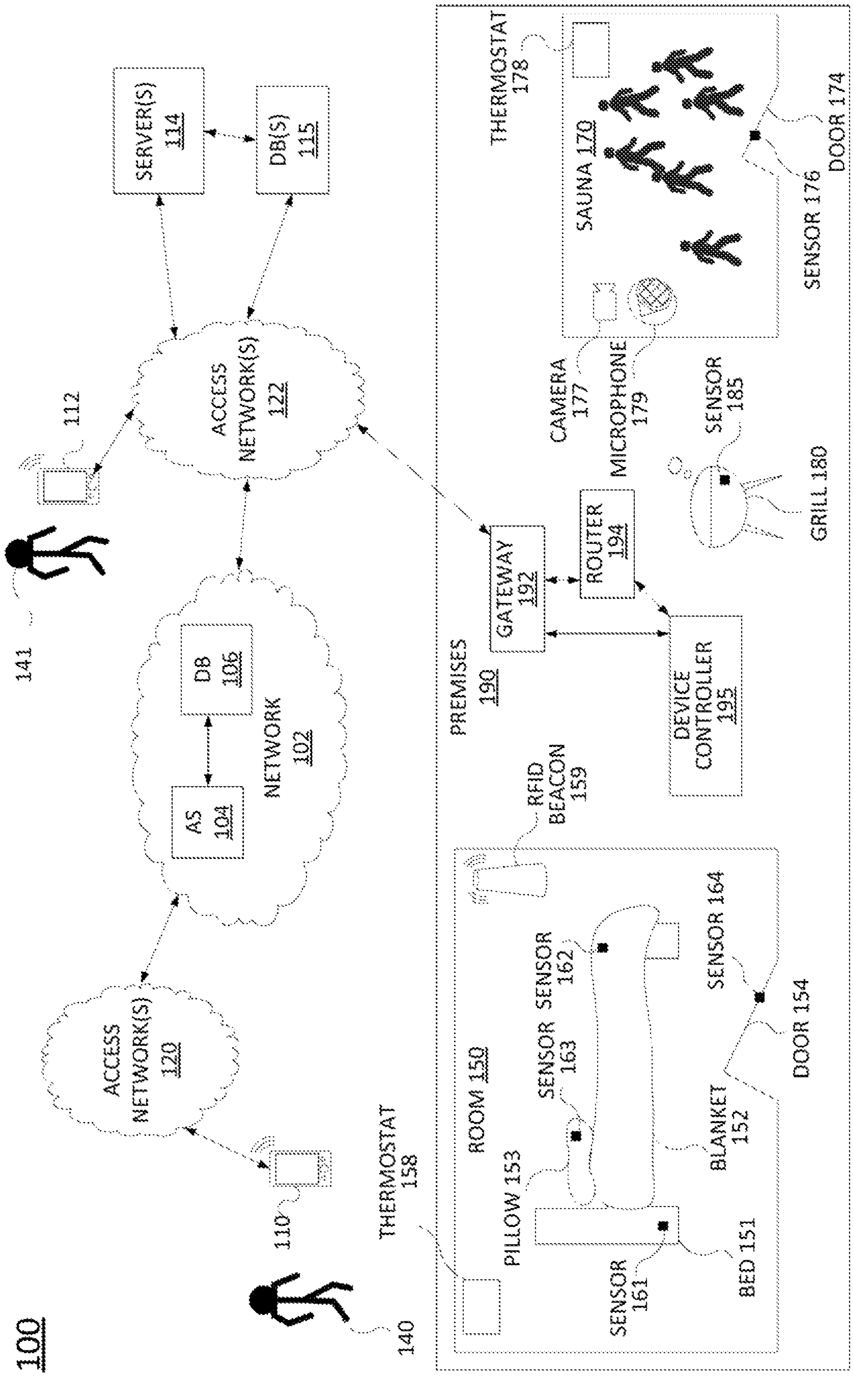
FIG. 1 illustrates an example system comprising one or more communication networks related to the present disclosure.

Examples of the present disclosure enable individual amenity elements or features of a premises to be reserved for use, and for the use to be detected and recorded. Access to the reserved amenities may be electronically enabled once reserved. Additionally, premises rules related to the use of the space or amenities within the space may be enforced.

Examples of the present disclosure provide a renter of a premises, such as a house or apartment, with the option of selecting and de-selecting amenities, or features that may be used during the stay. Features/amenities may include specific portions of the premises, items within the premises, technologies within the premises, and other useful elements. Examples of the present disclosure also enables an owner, operator, or manager of the premises to price the use in accordance with amenities that are used and make for more efficient maintenance of the space (e.g., if an amenity is not used, it may not need to be cleaned after the renter departs).

A user may access a reservation system via a computing device to view information about properties/premises for rent and their available features/amenities and premises rules. The reservation system may store reservations and data about properties for rent in a reservation database. Properties for rent may have one or more devices on-site that regulate access to features or monitor use of the features and use of the space of the property. These devices may be various types of environmental sensors, space access controls (such as door locks), and technology access controls (such as devices enforcing password access).

Available features for a property may be included in an inventory for the property in the reservation database. If there is a charge for using a feature (or a discount for not using it), it may be included as well. Some features/amenities, may also have a related control device, which controls access to the feature. For instance the control device may be a physical or electronic lock having a key, combination, password, or similar access mechanism. An entry in the reservation database may include a control device identifier (ID) and a state value, which may be set to a "reset" state when the feature is not accessed or in use. It may be reset to a "locked" or "unlocked" state. Similarly, a listing of premises rules (or "house rules") may be represented in the reservation database for the premises. Each rule may be associated with one or more sensors that are used to monitor compliance with the rule. A rule threshold may be included to indicate how to determine if the rule is violated. Each premises rule may be set to a "reset" state when the feature is not accessed or in use.

When a user is making a reservation for a premises, the user may be presented with a listing of available features. The renter may pre-specify which features are expected to be use during the rental period. The features selected may alter the price charged for the rental reservation. The reservation system may store the renter's selections. The reservation system may send a digital key to the renter's device, such as a smartphone. This key may be used to access the premises during the rental time period.

When the user first accesses the premises, the selected features may be unlocked using the control device(s). Alternatively, various features may be unlocked or simply available/not locked, and their use or lack of use is detected using various sensors to determine what feature use charges may apply and what features or features-related areas may need maintenance or cleaning after departure. When entering the premises, a computing device carried into the premises by the user (or multiple users associated with the rental) may register with the premises, e.g., via a Wi-Fi access point, or the like. Each such device may be registered and counted as a renter-owned device as a temporary inventory item for the premises for the duration of the stay.

If a user wishes to use an unreserved feature, the user may do so by updating the reservation via the user's computing device (e.g., to unlock the door to bedroom 2, for example). If an alternate configuration is used whereby unreserved features are unlocked and accessible at any time, the use of such features may be detected via one or more sensors. For instance, if the door to bedroom 2 is opened, use of bedroom 2 may be charged. Alternatively, or in addition, use of bedroom 2 may be detected via motion sensors or weight sensors in the bed, for instance. In a similar way, a grill having a network-connected temperature sensor or other sensor(s) may be detected as being used if it is ignited—or likewise for a washer, dryer, hot tub, or other features.

After the renter's first entry to the premises, compliance with the premises rules may be monitored using various environmental sensors. For instance, infrared cameras or other sensors may be used to detect the number of occupants or a room, a hot tub or other features, or the premises overall, and to ensure that a maximum capacity threshold is not exceeded. If the threshold is exceeded, an alert may be sent to the reservation system, the user, and/or the premises owner, manager, or the like. Similarly, if one or more pets are detected at a premises with a "no pets allowed" rule, an alert may be sent. The pet(s) may be detected via one or more sensors comprising infrared camera(s), microphones, or the like. For instance, detection models (e.g., machine learning based models) for detecting dogs, cats, birds, etc. from audio recordings and/or from images or video recordings may be implemented by the respective sensors, at a local control device on the premises that is connected to the sensor device(s), and/or via a network-based processing system receiving sensor data feed(s). Similarly, loud noise levels violating a noise rule, cigarette smoke violating a no smoking rule, and so forth may be detected. In one example, if a premises rule is "keep front door locked at all times," and if an electronic lock is detected to be open or unlocked for greater than 1 minute, an alert may be sent.

In one example, a premises rule may be "no sheets, towels, and other items (e.g., wall and room decorations, furniture, bathroom fixtures, kitchen fixtures, lighting fixtures, and the like) may be removed from the house". To monitor compliance in this case, motion sensors, location sensors or contact sensors may be attached to such items, and their locations may be monitored in relation to a geographic zone such as the perimeter of the premises. For instance, the sensors may report to a local controller via Wi-Fi, Bluetooth, or other wireless connections. In this way, if a renter takes a dining room chair outside the premises for outdoor use, an alert may be sent. In a similar way, this approach may also be used to detect amenity/feature use. For instance, location sensors or motion sensors may be sewn into the corner of an extra pillowcase. Any detected movement during the user's stay may serve as an indication of use of that feature/amenity. Alternatively, or in addition, a sensor such as a radio frequency identification (RFID) beacon may detect RFID tags sewn into or otherwise affixed to various features/amenities to detect the movement of such features.

When the user departs the premises for the last time during the visit, the user may provide an indication of the departure, for example, by using a check-out screen provided by the reservation system via the user's mobile computing device. After checkout (and before cleaning) a usage report may be generated by the reservation system using data collected from the control device(s) and sensors during the period of time of the rental. The usage report may include a listing of features that were reserved but not used, and likewise a listing of features that were used but not reserved during the user's stay.

The usage report may be used to make any billing additions or refunds, with a notification of the adjustments sent to the user's computing device. Additionally, the usage report may be used to dynamically help inform a cleaning or maintenance crew about needs for the premises after departure. For example, if bedroom 3 was not used, it may not need cleaning. However, if the extra pillows in bedroom 2 were used, the pillowcases should be washed. Data from usage reports may be aggregated over a number of rentals to gain additional insights. For instance, a dryer may need to have its lint trap cleaned after every five uses, or if bedroom 3 is not used for one month, it may still need to be dusted. The usage report may also report on the number of user-owned devices that connected to a computing network of the premises versus the number that disconnected at departure. If a user-owned device is left behind, an alert may be sent reporting the detection of the device still at the premises, thereby allowing the renter to be notified promptly of this left behind device.

After departure, the property may be cleaned or otherwise maintained, and then the feature tracking and house rule tracking settings may all be set to their "reset" settings. It may also be useful to a next user (e.g., another renter) or prospective renter to know how long the premises has been "reset," or vacant from anyone, including a cleaning crew. Some users may find this to be informative to avoid potential airborne contagions that die off over time. For instance, a user may check on how long the premises has been reset at the time of making the reservation and again just before entering the premises. These and other aspects of the present disclosure are described in greater detail below in connection with the examples of FIGS. 1-6.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute of Electrical and Electronics Engineers (IEEE) 802.11/Wi-Fi network and the like), cellular access networks, 3rd party networks, and the like. For example, the operator of network 102 may provide a broadband Internet access service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like. In one example, one or more of access network(s) 122 may be associated with a restaurant 190.

In one example, the access networks 120 may be in communication with one or more device, e.g., device 110. Similarly, access networks 122 may be in communication with one or more devices, e.g., device 112, servers 114, DB(s) 115, gateway 192, etc. Access networks 120 and 122 may transmit and receive communications between devices 110 and 112, server(s) 114, gateway 192, application server (AS) 104 and/or other components of network 102, devices reachable via the Internet in general, and so forth. In one example, each of the devices 110 and 112 may comprise any single device or combination of devices that may comprise an endpoint device, e.g., a client device. For example, the devices 110 and 112 may each comprise a mobile device, a cellular smart phone, a laptop, a tablet computer, a desktop computer, a wearable computing device (e.g., a smart watch, a smart pair of eyeglasses, etc.), an application server, a bank or cluster of such devices, or the like.

In one example, device 110 may be associated with a user 140 (e.g., a renter of a premises 190) and device 112 may be associated with another user 141, e.g., an owner or manager of premises 190, or the like. For instance, device 110 may have an application (app) installed thereon, which may facilitate making a reservation/rental of premises 190, select features/amenities to be used, checking in and checking out at a time of the rental, and so forth. Similarly, device 112 may have an application installed thereon for managing the premises 190, receiving alerts/notifications of rule violations and/or reports on the usage of the premises 190. In one example, either or both of devices 110 or 112 may include one or more radio frequency (RF) transceivers (as well as antenna(s), and/or other components) for cellular communications and/or for non-cellular wireless communications, such as for IEEE 802.11 based communications, IEEE 802.15 based communications, and so forth.

Figure 4:
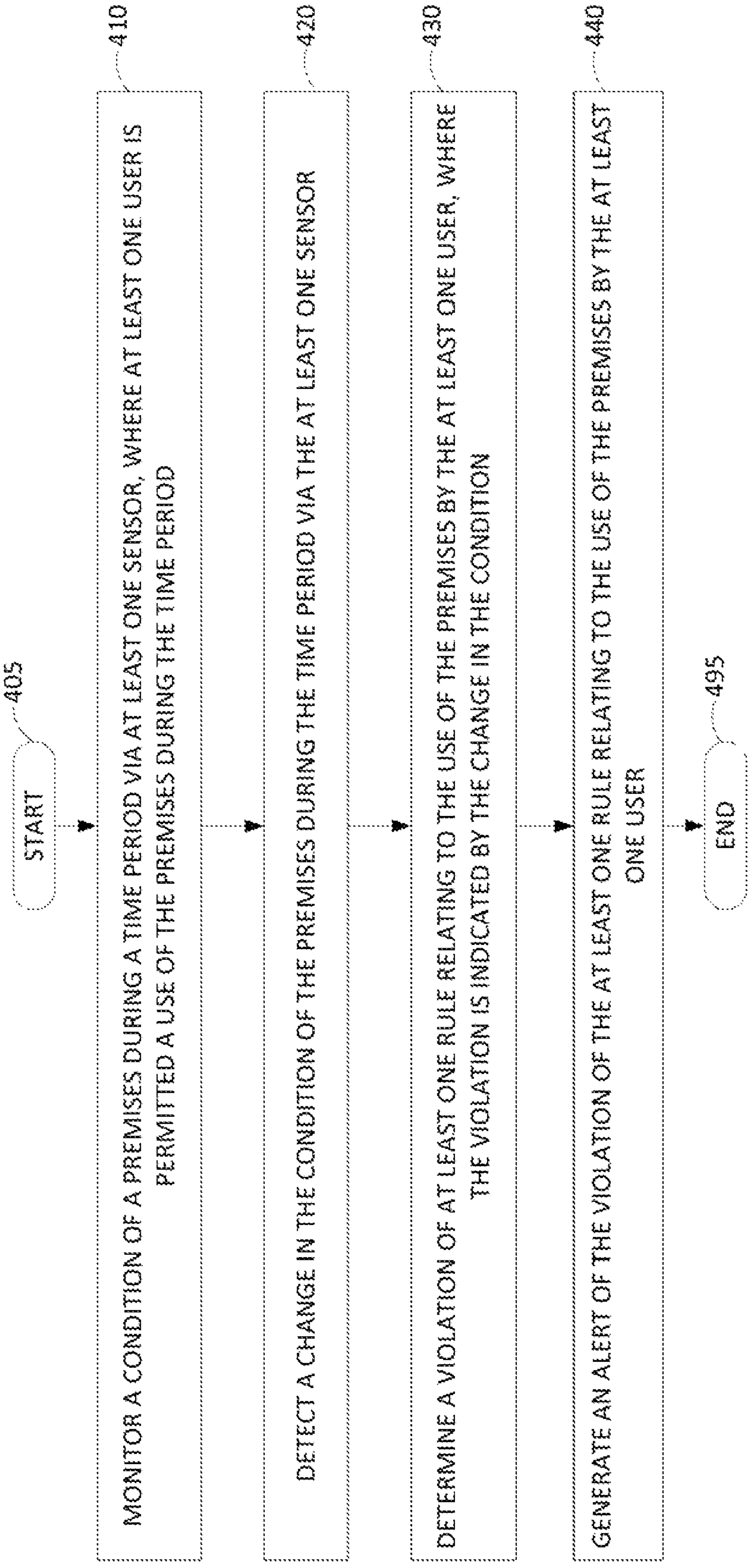
FIG. 4 illustrates a flowchart of an example method for determining a violation of at least one rule relating to the use of a premises by at least one user in response to a change in the condition of the premises detected via at least one sensor.
Figure 5:
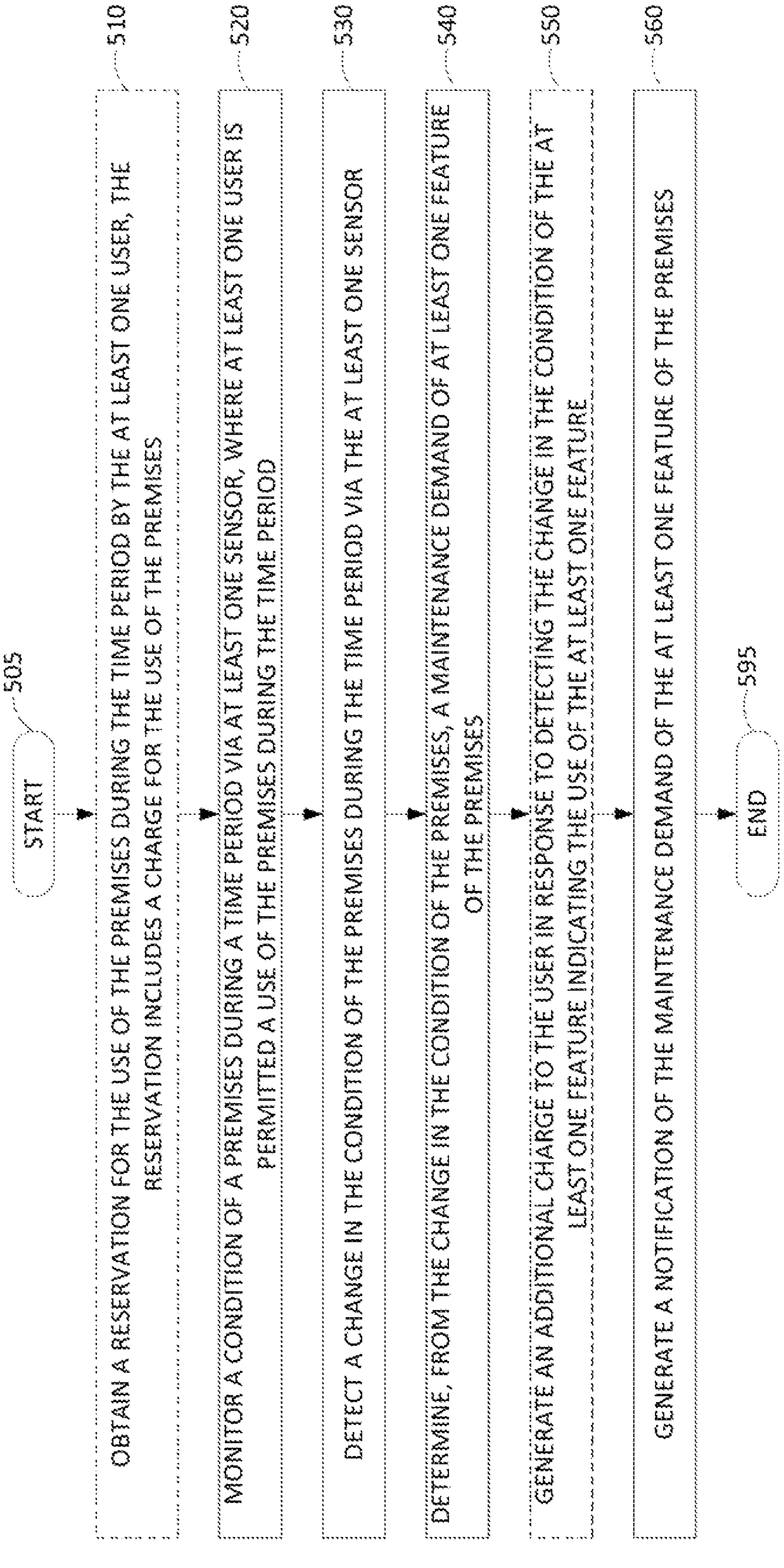
FIG. 5 illustrates a flowchart of an example method for determining a maintenance demand of at least one feature of a premises from a change in a condition of the premises detected via at least one sensor.
Figure 6:
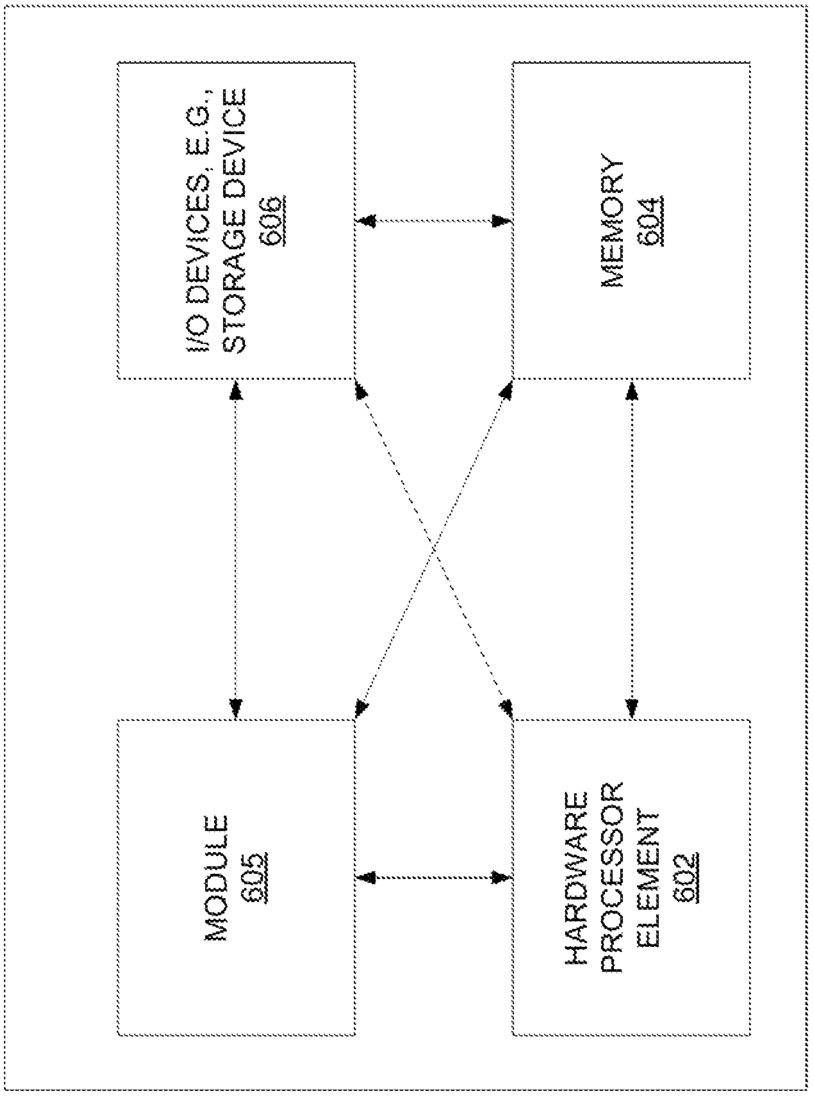
FIG. 6 illustrates a high level block diagram of a computing device specifically programmed to perform the steps, functions, blocks and/or operations described herein.

In one example, devices 110 and 112 may each comprise a computing device or processing system, such as computing system 600 depicted in FIG. 6, and may be configured to provide one or more operations or functions in connection with examples of the present disclosure for determining a violation of at least one rule relating to the use of a premises by at least one user in response to a change in the condition of the premises detected via at least one sensor and/or for determining a maintenance demand of at least one feature of a premises from a change in a condition of the premises detected via at least one sensor. A flowchart of an example method 400 for determining a violation of at least one rule relating to the use of a premises by at least one user in response to a change in the condition of the premises detected via at least one sensor is illustrated in FIG. 4 and discussed in greater detail below. In addition, a flowchart of an example method 500 for determining a maintenance demand of at least one feature of a premises from a change in a condition of the premises detected via at least one sensor is illustrated in FIG. 5 and discussed in greater detail below.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 6 and discussed below) or multiple computing devices collectively configured to perform various steps, functions, and/or operations in accordance with the present disclosure.

Similarly, server(s) 114 may each comprise a computing system or server, such as computing system 600 depicted in FIG. 6, and may be configured to perform operations in connection with examples of the present disclosure for determining a violation of at least one rule relating to the use of a premises by at least one user in response to a change in the condition of the premises detected via at least one sensor and/or for determining a maintenance demand of at least one feature of a premises from a change in a condition of the premises detected via at least one sensor, e.g., as described in connection with FIGS. 4 and 5. For instance, server(s) 114 may provide a premises monitoring and management service (e.g., a "premises monitoring and management system") in accordance with the present disclosure. In one example, database(s) 115 may represent one or more centralized or distributed file systems, e.g., a Hadoop® Distributed File System (HDFS™), or the like. Server(s) 114 may receive and store information in database(s) 115 relating to different users, such as user 140, different premises, such as premises 190, the features/amenities of such properties, available sensor devices and/or control devices, the rentals/reservations of such premises and their features/amenities, the usage of the premises and their features/amenities, including features unreserved in advance that are used during the course of a user's visit, any rule violations, charges and payments for the use of the premises and/or their features/amenities, usage reports, and so forth. In one example, server(s) 114 may establish communications with gateway 192 and/or devices within premises 190 periodically or on another basis to obtain and update all or a subset of the information maintained in database(s) 115 relating to the premises 190.

In one example, AS 104 may comprise a network-based server (or servers) providing a premises monitoring and management service (e.g., a "premises monitoring and management system"). In this regard, AS 104 may comprise the same or similar components as server(s) 114 and may provide the same or similar functions, or at least a portion thereof. For instance, an operator of network 102 may provide a premises monitoring and management service via AS 104 in accordance with the present disclosure (e.g., in addition to telecommunication services such as TV, phone, internet access, etc., as described above). Accordingly, DB(s) 106 may be the same as or similar to DB(s) 115 and may store the same or similar information. Thus, although the following examples are described primarily in connection with server(s) 114, it should be understood that the descriptions may equally apply to AS 104.

In one example, premises 190 may include a gateway 192 (e.g., a home gateway), which receives data/communications associated with different types of media, e.g., television, phone, and Internet, and separates these communications for the appropriate devices. Gateway 192 may similarly receive and forward outbound communications from devices at premises 190. In one example, television data is forwarded to set-top boxes (STBs)/digital video recorders (DVRs) to be decoded, recorded, and/or forwarded to television(s) for presentation. In addition, telephone data is sent to and received from one or more telephones. It should be noted that for ease of illustration, STBs/DVRs, televisions, and telephones are omitted from FIG. 1. Similarly, Internet communications are sent to and received from router 194, which may be capable of both wired and/or wireless communication. In turn, router 194 may receive data from and send data to the appropriate devices, e.g., device controller 195, camera 177, microphone 179, thermostat 178 (e.g., a temperature sensor), RFID beacon 159, and any one or more of sensors 161-164, 176, and 185, and so forth. In one example, router 194 may further communicate with a user device such as device 110 of user 140 (e.g., a renter of premises 190). In one example, router 194 may comprise a wired Ethernet router and/or an IEEE 802.11 (Wi-Fi) router, and may communicate with respective devices in or at premises 190 via wired and/or wireless connections. In this regard, it should be noted that various features of premises 190 may comprise "smart" appliances (e.g., network-connected devices/Internet of Things (IoT) devices), with wired and/or wireless networking/communication capability. Thus, such appliances may be remotely programmed or configured, and may communicate operational data to remote devices via one or more networks or network links. These appliances may include a microwave, a refrigerator, or a coffee maker (not shown), a grill 180, and so forth. For instance, each of these devices may include a transceiver for IEEE 802.11-based communications, for IEEE 802.15-based communications, for wired communications, e.g., for wired Ethernet, and so forth.

In one example, premises 190 may include device controller 195. In one example, the device controller 195 may comprise a computing system, such as computing system 600 depicted in FIG. 6, and may be configured to provide one or more functions in connection with examples of the present disclosure for determining a violation of at least one rule relating to the use of a premises by at least one user in response to a change in the condition of the premises detected via at least one sensor and/or for determining a maintenance demand of at least one feature of a premises from a change in a condition of the premises detected via at least one sensor, such as illustrated in FIGS. 4 and 5 described below. As illustrated in FIG. 1, device controller 195 may be in communication with various network-connected devices/appliances at premises 190. In this regard, device controller 195 may also include a transceiver for IEEE 802.11-based communications, for IEEE 802.15-based communications, for wired communications, e.g., for wired Ethernet, and so forth. It should be noted that as described herein, functions of device controller 195 may similarly be performed by server(s) 114, and vice versa. However, for illustrative purposes, examples are described primarily in connection with server(s) 114. It should be further noted that in one example, one or more of sensors 161-164, 176, and 185 may comprise RFID tags (e.g., passive or active RFID tags), or may otherwise lack independent network communication capability. In such case, these sensors 161-164, 176, and/or 185, and/or the locations of such sensors, movement of such sensors, and so forth, may be detected by another sensor device, such as RFID beacon 159.

In an illustrative example, user 140 may have a reservation for the use of premises 190 for a given period of time. The use of sauna 170 and grill 180 may be included in an original reservation fee, but the use of room 150 (e.g., a second bedroom) may not. In addition, premises rules regarding premises 190 may be that no large furniture items are to be moved or rearranged, the maximum temperature for room 150 is 75 degrees Fahrenheit, the maximum capacity of the sauna 170 is four people, and the maximum temperature for sauna 170 is 150 degrees Fahrenheit.

Continuing with the present example, user 140 may arrive at premises 190 and may access the premises 190, e.g., with a passcode provided to user 140 at device 110, a physical key provided to user 140 in some manner, etc. At some time during the stay, user 140 may determine that the use of room 150 is desired. For instance, two children who were expected to share a bedroom may instead be given separate bedrooms. In this case, user 140 or another guest associated with user 140 (e.g., another family member, etc.) may enter the room 150. In one example, the entrance into the room 150 may be detected via sensor 164 of the door 154, e.g., an electronic trip/break or contact sensor, a magnetic sensor, an optical sensor, etc. Alternatively, the sensor 164 may comprise an RFID tag with movement of sensor 164 detected via RFID beacon 159 (e.g., an RFID reader). In one example, the change in the sensor status of sensor 164 may be communicated to device controller 195 and/or server(s) 114, which may determine that the status change is indicative of the use of room 150. In such case, the server(s) 114 may determine a maintenance demand for at least one aspect of room 150. For instance, at a minimum, a maintenance demand to vacuum or mop the floor may be noted in a record for premises 190 that may be stored in DB(s) 115. In one example, a maintenance demand to wash and change the bedding may also be noted in a record for premises 190 that may be stored in DB(s) 115.

Alternatively, or in addition, an actual use of bed 151 may be detected. For instance, changes in location/movement of blanket 152 and/or pillow 153 may be detected via RFID beacon 159 tracking/sensing the locations and/or movement of sensors 162 and/or 163 (e.g., RFID tags, or the like). For instance, the use of room 150 (and specifically the bedding therein) may be detected in the way, or may be determined by detecting entry into room 150 via sensor 164 of door 154, and further confirmed via detection of the change in location/motion of sensors 162 and/or 163. In such case, an additional charge may also be generated for the visit of user 140 based upon the determination that room 150 has been used.

For illustrative purposes, it may be further detected by server(s) 114 and/or device controller 195 via sensor 161 that the bed 151 has been moved. For instance, sensor 161 may detect and report a movement and/or change in position. In another example, the movement or change in location of sensor 161 may be detected via RFID beacon 159 (depending upon the nature of the sensor 161). Continuing with the present example, the movement of bed 151 may violate a premises rule of no movement of large furniture. In such case, the server(s) 114 may generate an alert of the violation of the rule. For instance, the alert may be sent to the user 141 at device 112. In one example, the alert may also be included in a usage report for the property, or may cause the usage report to include a notation of the violation of the rule. In addition, in one example, a surcharge for the rule violation may also be added. Similarly, an additional maintenance demand may be determined. For instance, the movement of the bed 151 may cause additional wear-and-tear on a floor or room 150, which may need to be inspected. For example, any scratches noticed on a hardwood floor may need to be repaired.

On the other hand, thermostat 158 may continuously monitor its own setting and may determine that the temperature has remained at 71 degrees. Thus, the rule relating to the maximum temperature of room 150 may not be violated during the stay of user 140 at premises 190. To further illustrate, a use of grill 180 may be detected via sensor 185 (e.g., a temperature sensor, an electronic sensor connected to a starter of the grill 180, etc.). For instance, sensor 185 may communicate a change in state (e.g., off to on, a temperature exceeding a threshold, etc.) to server(s) 114, which may determine a maintenance need corresponding to the usage of grill 180. For instance, a propane tank of the grill may be refilled every 10 uses as detected by server(s) 114 via sensor 185.

Referring now to sauna 170, at some time during the stay, user 140 and/or other guests associated with the reservation may use this feature. The use of the sauna 170 may be detected via sensor 176 of door 174 (e.g., detecting that door 174 is opened from a previously closed position) and/or via thermostat 178 detecting a temperature exceeding a threshold (similarly the usage may be detected via a humidistat sensing a humidity level exceeding a threshold). However, as illustrated in the example of FIG. 1, there may be six individuals in the sauna 170, which is a violation of the rule that the maximum capacity of the sauna 170 is 4 people.

In one example, the number of individuals may be detected via microphone 179 detecting a number of distinct voices within given time period (e.g., within one minute). For instance, a number of distinct voices may be detected in accordance with one or more ML-based models. For example, a model may be trained from extracted audio features, such as low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth, wherein the output of the model in response to a given input set of audio features is a prediction of the number of distinct voices present in the set of audio features.

In another example, camera 177 may be configured to detect a number of distinct individuals. In one example, the camera may not record video but may comprise a dedicated device that captures and analyzes images locally and that is only capable of reporting over a network a number of detected individuals (e.g., an infrared camera to detect distinct heat signatures correlated to individuals). The camera may store or maintain images in memory only as long as necessary to determine a number of individuals present. For example, camera 177 may use one or more object detection/recognition models for identifying people (in a non-personal manner) and a number individuals thereof. To illustrate, in order to detect the presence of people in visual information from camera 177, camera 177 may store a detection model. This may include one or more images of people (e.g., from different angles), and may alternatively or additionally include feature set derived from one or more images of people respectively. For instance, camera 177 may store a respective scale-invariant feature transform (SIFT) model, or a similar reduced feature set derived from image(s) of people, which may be used for detecting additional people in the visual information from camera 177 via feature matching. Thus, in one example, a feature matching detection algorithm employed by camera 177 may be based upon SIFT features. However, in other examples, different feature matching detection algorithms may be used, such as a Speeded Up Robust Features (SURF)-based algorithm, a cosine-matrix distance-based detector, a Laplacian-based detector, a Hessian matrix-based detector, a fast Hessian detector, etc.

The visual features used for detection of people may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, the camera 177 may perform an image salience detection process, e.g., applying an image salience model and then performing an image recognition algorithm over the "salient" portion of the image(s) or other visual information from camera 177. Thus, in one example, visual features may also include a length to width ratio of an object, a velocity of an object estimated from a sequence of images (e.g., video frames), and so forth. Similarly, in one example, camera 177 may apply an object detection and/or edge detection algorithm to identify possible unique items in the visual information from camera 177 (e.g., without particular knowledge of the type of item; for instance, the object/edge detection may identify an object in the shape of a person in a video frame, without understanding that the object/item is a person). In this case, visual features may also include the object/item shape, dimensions, and so forth. In such an example, object recognition may then proceed as described above (e.g., with respect to the "salient" portions of the image(s) and/or video(s)).

In one example, the detection of objects and their locations and/or position in the visual data of images/video of camera 177 may be in accordance with one or more machine learning algorithms (MLAs), e.g., one or more trained machine learning models (MLMs). For instance, a machine learning algorithm (MLA), or machine learning model (MLM) trained via a MLA may be for detecting a single object, or may be for detecting a single object from a plurality of possible objects that may be detected via the MLA/MLM. For instance, the MLA (or the trained MLM) may comprise a deep learning neural network, or deep neural network (DNN), such as convolutional neural network (CNN), a generative adversarial network (GAN), a support vector machine (SVM), e.g., a binary, non-binary, or multi-class classifier, a linear or non-linear classifier, and so forth. In one example, the MLA/MLM may be a SIFT or SURF features-based detection model, as mentioned above. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the object detection MLM(s) may be trained at a network-based processing system (e.g., server(s) 114) and deployed to camera 177. It should also be noted that various pre-processing or post-recognition/detection operations may also be applied. For example, camera 177 may apply an image salience algorithm, an edge detection algorithm, or the like (e.g., as described above) where the results of these algorithms may include additional, or pre-processed input data for the one or more MLAs. Thus, in the example of FIG. 1, camera 177 may apply any number of image pre-processing algorithms to images/video from camera 177, and may apply at least one object detection/recognition MLA for detecting a person or people (e.g., the six individuals illustrated in sauna 170). The camera may also be strategically placed, e.g., on the outside of the sauna over the door to only capture entry and exit events for the purpose of counting individuals.

Upon detecting that there are six individuals present in sauna 170 (either via camera 177, microphone 179, or both), a notification may be sent by such sensor device(s) to server(s) 114. It is again noted that images, video, and audio data are only used to determine the number of individuals present, and are not retained any longer than necessary to make such a determination. In addition, in one example, no image, video, or audio data leave the camera 177 and microphone 179. In another example, device controller 195 may receive and process image, video, or audio data from camera 177 and/or microphone 179 to make a similar determination. For instance, feature matching detection models, or the like may be implemented by device controller 195 instead of camera 177 and/or microphone 179. Nevertheless, in such case, the image, video, or audio data still never leaves the premises 190 and is not stored or recorded. In other words, the actual image, video, or audio data is never accessible to an owner or manager of the premises 190, or the like. In one example, camera 177, microphone 179, and/or device controller 195 may be certified as complying with certain privacy and security guarantees, such as by a third party auditor or certification authority. For instance, the manufacturers or others associated with the production and use of such devices may guarantee that user privacy is maintained and that no image, video, or audio data is retained for more than a duration of 1 minute, 2 minutes, 5 minutes, etc. In addition, it may be guaranteed that only the output of a number of individuals present may be sent externally from the device. Furthermore, in one embodiment a warning notice is provided to any potential renters of the use of various sensors and/or the sensors' sensing capabilities on the premises and the reservation of the premises is only confirmed once the potential renters have acknowledged and provided their affirmative consent as to the use of such sensors on the premises during their stay.

As illustrated in the example of FIG. 1, there are six individuals present in sauna 170. As such, server(s) 114 may receive a notification from camera 177, microphone 179, and/or device controller 195 of the detection of six people. As noted above, this may violate a premises rule of a maximum of four people being allowed in the sauna 170 as a safety precaution. It should be noted that the use of the sauna scenario to reflect a potential safety concern is only illustrative. For example, limiting the number of humans in an area such as an outdoor deck due to weight supporting limitation may constitute another safety concern. In such case, the server(s) 114 may generate an alert (e.g., in real time if the violation pertains to a safety issue) of the violation of the rule. For instance, the alert may be sent to the user 141 at device 112 in real time. In one example, the alert may also be included in a usage report for the property, or may cause the usage report to include a notation of the violation of the rule. In addition, in one example, a surcharge for the rule violation may also be added.

In one example camera 177 may alternatively or additionally comprise or be part of a light detection and ranging (LIDAR system). In such case, the camera 177 may similarly detect individuals via feature matching and/or via a machine learning model trained in accordance with a LIDAR-based feature set. However, in another example, a reduced set of point cloud data may be sufficient to identify a number of humans present in a room or other spaces (e.g., an outdoor deck), without implicating the same privacy concerns as noted above. Thus, in one example, camera 177 may forward sensor data (e.g., LIDAR point cloud data) to server(s) 114, wherein server(s) 114 may identify a number of humans present in the same or similar manner as described above.

It should be noted that the foregoing is just one illustrative example of how examples of the present disclosure for determining a violation of at least one rule relating to the use of a premises by at least one user in response to a change in the condition of the premises detected via at least one sensor and/or for determining a maintenance demand of at least one feature of a premises from a change in a condition of the premises detected via at least one sensor may operate. Thus, it should be noted that in other, further, and different examples, aspects described above with respect to server(s) 114 may alternatively or additionally be provided by AS 104. Similarly, functions or operations described in connection with server(s) 114 may alternatively or additionally be provided by device controller 195. For instance, device controller 195 may be in communication with sensors 161-164, 176, and 185, camera 177, microphone 179, RFID beacon 159, thermostats 158 and 178, etc. and may monitor and detect rule violations and/or maintenance needs, may generate alerts and/or usage reports regarding premises 190, and so on. In one example, a usage of sauna 170 may initially be determined via sensor 176 of door 174, and may be further confirmed via thermostat 178, camera 177, and/or microphone 179. For instance, the detection via camera 177 and/or microphone 179 of a number of individuals present in sauna 170 may not detect a rule violation, but may detect that only three individuals are present. However, this may further confirm that the sauna 170 was actually used and therefore has a maintenance need. In addition to the foregoing, various other features of the present disclosure may be provided via the system 100, such as enabling user 140 to check-out at departure via device 110, to receive any additional charges incurred during the use of premises 190, to approve and/or to pay the additional charges, and so on.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with network 102 independently or in a chained manner. For example, server(s) 114 and gateway 192 may reach network 102 via different access networks, and so forth. Thus, these and other modifications are all contemplated within the scope of the present disclosure.

To further illustrate aspects of the present disclosure, FIG. 2 depicts an example amenity database 210 (e.g., a database including information regarding features/amenities available at a premises, such as premises 190 of FIG. 1). As illustrated in FIG. 2 amenity database 210 may include an entry for each amenity/feature, which may include a number of fields, such as: an access charge, sensor identifier (ID), current state, and reset state. For amenities having an access charge of "$0" these amenities may be included in a base cost of a reservation for a premises. For non-zero access charges, the corresponding amenities may be available at the premises, but for an additional fee/charge as indicated in the amenity database 210. The control device IDs may be used by a premises monitoring and management system to determine which amenities may be accessed during the course of a reservation of the premises. For instance, notification of state changes or current readings/measurements may be received by the premises monitoring and management system from sensors at the premises. The notifications may include corresponding control device IDs (e.g., identifiers of the respective sensors) indicating which sensor is sending or is the source of which notification. The reset state may be a state that each amenity of the premises is expected to be in for the start of a reservation for each guest or group of guests. For instance, a maintenance crew may be tasked with closing access doors to different amenities (e.g., bedrooms, sauna, etc.), placing appliances and bedding in a clean condition, etc.

A current state may be a state that is reached for each amenity during the course of a stay. For instance, if a bedroom door is opened at any time during the stay, the current state may change from "closed" to "accessed." The current state may stay as "accessed" until a maintenance crew readies the premises for a next guest or group of guests (and resets the state to the corresponding reset state of "closed"). Similarly, an appliance may be in a "clean" state until it is detected that the appliance is used, in which case the corresponding state may change to "used" (and remain in this state for the duration of the stay). In this case, the guest(s) may have used/accessed bedrooms 1 and 2, but not bedroom 3. The guest(s) may also have used the grill, washer, and dryer, but not the stove. In addition, both the sauna and hot tub may be used/accessed, while the extra pillows and blankets may remain unused during the course of the stay. In one embodiment, a renter may be allocated "X" dollar amount of amenities (e.g., $100, $200, $300, etc.) and the renter will not be charged if the aggregated use of the amenities during the stay does not exceed $X, whereas any overage of $X will be added as an extra charge. This will allow the renter to allocate the $X based on the renter's individual preference.

To further aid in understanding the present disclosure, FIG. 3 illustrates an example premises rules database 300. As shown in FIG. 3, each premises rule may have an entry with a number of fields, including the rule itself, as well as a sensor ID, rule threshold, current state, and reset state. For instance, the rule for maximum capacity (with respect to persons/people) may have a threshold of "4" (e.g., a maximum of 4 people). The reset state may be zero (0), which is expected when a premises is offered vacant for an incoming guest or group of guests. The current state may be determined from the sensor(s) identified by the sensor IDs in the "sensor ID" field. For instance, a premises monitoring and management system may receive sensor readings from camera XYZ and microphone ABC (e.g., a number of detected users/guests). In the illustrative example of FIG. 3, the current state of the premises relating to a number of people may be (6), which exceeds the rule threshold. In such case, the current state exceeding the corresponding rule threshold may trigger a premises monitoring and management service to generate an alert of the rule violation. It should be noted that in one example, a "current state" may be a maximum (or minimum) sensor reading/value obtained during the course of a stay. Thus, for example, if the most number of guests in the sauna detected during the course of the stay is (6), then the "current state" may stay at (6).

Various additional premises rules are shown in FIG. 3. For instance, an additional premises rule may relate to a maximum number of pets (e.g., zero (0)), whereas a current state of (1) (or greater) indicates that this rule has been violated. For example, the presence of a pet/animal may be detected via camera XYZ and/or microphone ABC. To illustrate, sounds or images of animals/pets may be detected according to various feature matching and/or machine learning models for detecting cats, dogs, birds, etc. in audio or visual data. Other rules may relate to a maximum sound level (where a violation may be determined via microphone ABC), "no smoking," which may be detected via an air quality sensor, a removal of amenities and/or movement of furniture, which may be detected by one or more sensors (such as RFID tags and/or RFID reader(s)/beacon(s), or sensors having internal GPS units, gyroscopes, compasses, and/or accelerometers, etc.), a maximum temperature which may be detected via a thermostat 789, and so forth. In each case, a rule violation may have one or more corresponding actions (e.g., generate alert, add to usage report, add maintenance demand, lock amenity, etc.). For instance, if an amenity is detected as being removed from the premises, an alert may be generated. However, in addition, if a removed amenity is detected as being brought back to its proper location, the premises monitoring and management system may cause a door to the room to be locked to prevent further outside access, for example. For instance, the guests may no longer be able to access the room where the amenity is located for the duration of the stay as a consequence of violating the rule, or may need to obtain authorization from an owner or manager to unlock the room and re-access the amenity or any other amenities in the same locked space. These and other aspects of the present disclosure are further illustrated in connection with FIGS. 4 and 5, and described in greater detail below.

FIG. 4 illustrates a flowchart of an example method 400 for determining a violation of at least one rule relating to the use of a premises by at least one user in response to a change in the condition of the premises detected via at least one sensor. In one example, the method 400 is performed by one or more servers of a premises monitoring and management system, or service, such as server(s) 114 or AS 104 of FIG. 1, a device controller, such as device controller 195 of FIG. 1, or any one or more components thereof, or by any one or more of such servers or devices in conjunction with one another and/or in conjunction with other devices and/or components of system 100 of FIG. 1. In one example, the steps, functions, or operations of method 400 may be performed by a computing device or processing system, such as computing system 600 and/or hardware processor element 602 as described in connection with FIG. 6 below. For instance, the computing system 600 may represent any one or more components of the system 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 600 may collectively function as a processing system. For illustrative purposes, the method 400 is described in greater detail below in connection with an example performed by a processing system. The method 400 begins in step 405 and proceeds to step 410.

At step 410, the processing system monitors a condition of a premises during a time period via at least one sensor, where at least one user is permitted a use of the premises during the time period. The at least one sensor may comprise at least one of: a camera, a motion sensor, a location sensor, a microphone, a weight sensor, an air quality sensor, an RFID reader (e.g., an RFID beacon), a thermostat (or a thermometer or other temperature sensor), a humidistat (or other humidity sensor), and so forth. For instance, a motion sensor can be an internal motion sensor of an item within the premises (e.g., a gyroscope, compass, and/or accelerometer, or the like embedded in or attached to an appliance, a vehicle, etc.) or can be an external motion sensor, such as an infrared camera, a photodetector, a LIDAR system, etc. In such case there may be a guarantee based on an audit that the sensor device does not video record the premises. For instance, the sole purpose of the camera may be to enable determining a presence and/or number of people or pets, where the video or imagery is not saved for any longer than necessary to process and determine activity/no activity, pet present/not present, etc. Similarly, with regard to a microphone and the overall processing system, there may be a guarantee of no audio recording, which may be provided in accordance with an independent audit. For instance, the sole purpose of the microphone may be to detect voices or activity within a room, a number of voices, the sound of a dog, cat, bird, or other animals (indicating the presence of at least one pet), etc., where the audio is not saved for any longer than necessary to process and determine activity/no activity, pet present/not present, etc.

At step 420, the processing system detects a change in the condition of the premises during the time period via the at least one sensor. For instance, the change in the condition of the premises may comprise a presence of a number of people in relation to the at least one feature. For instance, the at least one feature may be a room, a sauna, a hot tub, a deck, etc. In one example, the change in the condition may comprise a noise level (e.g., an increase in a noise level from an average or baseline, etc.). In one example, the change in the condition may comprise a change in the temperature and/or humidity of a room or other spaces, and/or a change in a thermostat setting, a change in a humidistat setting, etc. In one example, the change in the condition of the premises may comprise a presence of at least one pet (e.g., detected via a feature matching and/or a machine learning-based detection model in accordance with a feature set based upon source images, video, and/or audio from a camera, a LIDAR system, a microphone, or similar sensors). In one example, the change in the condition of the premises may comprise a movement of at least one item. For instance, movement of the at least one item may be detected via an RFID reader sensing RFID tags being moved (and hence the items to which the RFID tags are attached) or via sensor(s) attached to the at least one item that are capable of detecting their own movement via GPS units, gyroscopes, compasses, accelerometers, etc.

At step 430, the processing system determines a violation of at least one rule relating to the use of the premises by the at least one user, wherein the violation is indicated by the change in conditions. In one example, the at least one rule may comprise a maximum capacity of at least one feature of the premises. For instance, when the change in the condition of the premises detected at step 420 comprises a presence of a number of people in relation to the at least one feature, step 430 may comprise determining that the number of people exceeds the maximum capacity of the at least one feature. In one example, the at least one rule may comprise a rule defining a maximum noise level. For instance, when the change in the condition of the premises detected at step 420 comprises a noise level at the premises during the time period, the determining of the violation of the at least one rule at step 430 may comprise determining that the noise level at the premises exceeds the maximum noise level. Similarly, another rule may be a maximum temperature for a thermostat setting, e.g., a heat setting is not to exceed 80 degrees Fahrenheit in winter, where step 430 may comprise detecting that the heat setting in fact exceeds this threshold. In one example, the at least one rule may comprise a rule defining a restriction on a presence of pets. For instance, when the change in the condition of the premises detected at step 420 comprises a presence of at least one pet, the determining of the violation of the at least one rule at step 430 may comprise determining that at least one pet is present (e.g., where the limit is zero pets/no pets (or other animals)). In one example, the at least one rule may comprise a rule defining a restriction on a movement of at least one item associated with the premises. For example, the restriction on the movement of the at least one item associated with the premises may comprise a prohibition of a removal of the at least one item from the premises, or a limitation of the movement of the at least one item within the premises. For instance, when the change in the condition of the premises determined at step 420 comprises a movement of the at least one item, the determining of the violation of the at least one rule at step 430 may comprise determining that the movement of the at least one item that is prohibited has occurred or determining that the at least one item has been moved in excess of the limitation. This may include both removal of amenities (e.g., bath towels are not to be taken to the beach) and the movement of furniture (e.g., no rearranging of the living room). For instance, movement in excess of a limitation can be the taking of the at least one item beyond the room to which it belongs or can be the taking of the at least one item completely beyond the premises.

At step 440, the processing system generates an alert of the violation of the at least one rule relating to the use of the premises by the at least one user. For instance, step 440 may include transmitting the alert to at least one of: a device of an owner of the premises, a device of a manager of the premises, a device of the user, and so forth.

Following step 440, the method 400 proceeds to step 495. At step 495 the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 410-440 wherein additional changes in the condition of the premises are detected during the use of the premises by the user(s), additional rule violations are determined, additional alerts are generated, and so on. In one example, the method 400 may be expanded or modified to include steps, functions, and/or operations described below in connection with the example method 500 of FIG. 5, or as described elsewhere herein. For instance, the method 400 may comprise detecting a violation of a premises rule and adding a maintenance demand based upon the violation (e.g., if smoking is detected, a room and all its contents may now require additional cleaning, perhaps even in adjacent rooms that were otherwise unused). In addition, the method 400 may further include adding a surcharge for the violation, and so forth. In one example a rule violation relating to at least one feature of the premises may cause the at least one feature to become locked/inaccessible to the user(s), e.g., of the at least one feature can be locked, or locked away from user access, remotely deactivated, etc. Thus, these and other modifications are all contemplated within the scope of the present disclosure.

FIG. 5 illustrates a flowchart of an example method 500 for determining a maintenance demand of at least one feature of a premises from a change in a condition of the premises detected via at least one sensor. In one example, the method 500 is performed by one or more servers of a premises monitoring and management system, or service, such as server(s) 114 or AS 104 of FIG. 1, a device controller, such as device controller 195 of FIG. 1, or any one or more components thereof, or by any one or more of such servers or devices in conjunction with one another and/or in conjunction with other devices and/or components of system 100 of FIG. 1. In one example, the steps, functions, or operations of method 500 may be performed by a computing device or processing system, such as computing system 600 and/or hardware processor element 602 as described in connection with FIG. 6 below. For instance, the computing system 600 may represent any one or more components of the system 100 that is/are configured to perform the steps, functions and/or operations of the method 500. Similarly, in one example, the steps, functions, or operations of the method 500 may be performed by a processing system comprising one or more computing devices collectively configured to perform various steps, functions, and/or operations of the method 500. For instance, multiple instances of the computing system 600 may collectively function as a processing system. For illustrative purposes, the method 500 is described in greater detail below in connection with an example performed by a processing system. The method 500 begins in step 505 and may proceed to optional step 510 or to step 520.

At optional step 510, the processing system may obtain a reservation for the use of the premises during the time period by the at least one user, the reservation including a charge for the use of the premises.

At step 520, the processing system monitors a condition of the premises during a time period via at least one sensor, wherein at least one user is permitted a use of the premises during the time period. The at least one sensor may comprise at least one of: a camera, a motion sensor, a location sensor, a microphone, a weight sensor, an air quality sensor, a LIDAR system, an RFID reader (e.g., an RFID beacon), a temperature sensor, a humidity sensor, and so forth. For instance, a motion sensor can be an internal motion sensor of an item within the premises (e.g., a gyroscope, compass, and/or accelerometer, etc. of an appliance, vehicle, and so forth) or can be an external motion sensor, such as an infrared camera, a photodetector, etc. For instance, the at least one sensor may be the same or similar to those noted above in connection with step 410 of the method 400.

At step 530, the processing system detects a change in the condition of the premises during the time period via the at least one sensor. In particular, step 530 may comprise detecting a change in the condition of the at least one feature of the premises, where the change in the condition of the at least one feature of the premises indicates a use of the at least one feature. For instance, the at least one feature may comprise at least one bedding item, where the change in the condition of the premises may comprise a use of the at least one bedding item. To illustrate, the use of the at least one bedding item may be detected when the at least one bedding item is moved, as determined from the at least one sensor (such as a motion sensor and/or a location sensor sewn into the at least one bedding item, or an RFID scanner/beacon detecting the movement of RFID tag(s) sewn in to the bedding item(s) or otherwise attached to the bedding item(s)). In one example, the use of the bedding item(s) can be further confirmed by a sensor of a door to a room containing the at least one bedding item indicating that the door has been opened, motion sensors in the room indicating human movement in the room, etc. In one example, the at least one feature of the premises may comprise at least one appliance, where the change in the condition of the premises may comprise a use of the at least one appliance. For instance, the at least one appliance may include a coffee maker, a blender, a microwave, a stove, a grill, or the like, and may alternatively or additionally include a hot tub, a sauna, a fireplace, an indoor or outdoor space heater, a blow dryer, an iron, and so forth. In one example, the at least one feature of the premises may comprise at least one vehicle, where the change in the condition of the premises may comprise a use of the at least one vehicle. For instance, the at least one vehicle may comprise a boat included in a rental of the premises, such as a kayak, a sailboat, a motorboat, etc., an all-terrain vehicle ATV, a moped, a bicycle, an electric scooter, etc. In one example, the at least one feature of the premises may include at least one room, e.g., where the change in the condition of the premises comprises a use of the at least one room.

At step 540, the processing system determines, from the change in the condition of the premises, a maintenance demand of at least one feature of the premises. In one example, the maintenance demand may be determined in accordance with a maintenance rule associating a quantity of usage of the at least one feature with the maintenance demand. For instance, in an example in which the change in the condition of the premises comprises a use of the at least one bedding item, the maintenance demand may comprise a requirement to clean the at least one bedding item (e.g., a determined via the matching maintenance rule). Similarly, in an example where the change in the condition of the premises comprises a use of the at least one appliance, the maintenance demand may comprise a requirement to clean the at least one appliance, a requirement to refuel the at least one appliance, a requirement to recharge the at least one appliance, and/or a requirement to restock items associated with the at least one appliance, and so forth. For example, a maintenance rule may be that a propane tank needs to be refueled every 12 uses. In an example in which the change in the condition of the premises comprises a use of the at least one vehicle, the maintenance demand may comprise a requirement to clean the at least one vehicle, a requirement to refuel the at least one vehicle, a requirement to recharge the at least one vehicle, a requirement to perform a safety check of the at least one vehicle, and/or a requirement to replace at least one part of the at least one vehicle, and so forth. In an example in which the change in the condition of the premises comprises a use of the at least one room, the maintenance demand may comprise a requirement to clean the at least one room (and/or any contents therein).

At optional step 550, the processing system may generate an additional charge to the at least one user in response to detecting the change in the condition of the at least one feature indicating the use of the at least one feature. For instance, the at least user may be billed for the use of any additional features that were not prepaid for or otherwise included in a base cost of accessing the premises.

At step 560, the processing system generates a notification of the maintenance demand of the at least one feature of the premises. In one example, step 560 may comprise generating a report of the use of the premises during the time period, where the report includes the notification of the maintenance demand. For instance, step 560 may include transmitting the notification and/or the report to at least one of: a device of an owner of the premises, a device of a manager of the premises, a device of the user, and so forth. In one example, the notification and/or the report may include the additional charge that is generated at optional step 550.

Following step 560, the method 500 proceeds to step 595. At step 595 the method 500 ends.

It should be noted that the method 500 may be expanded to include additional steps, or may be modified to replace steps with different steps, to combine steps, to omit steps, to perform steps in a different order, and so forth. For instance, in one example the processing system may repeat one or more steps of the method 500, such as steps 510-560 wherein additional changes in the condition of the premises are detected during the use of the premises by a user (or those associated with the user), additional maintenance demands are determined, additional notifications are generated, and so on. In one example, step 530 may be expanded to include confirming the change in the condition of the premises via different sensor(s). For instance, the use of a room may be detected via a door sensor, but may be further confirmed by movement detection of bedding items via an RFID scanner/beacon sensing the movement of RFID tags associated with bedding items, thus confirming not only that the room was entered, but that it was actually used. For instance, a user may just look inside the room, but may decide against actually using the room. In one example, the method 500 may be expanded or modified to include steps, functions, and/or operations described above in connection with the example method 400 of FIG. 4, or as described elsewhere herein. For instance, the method 500 may comprise detecting a violation of a premises rule and adding a maintenance demand based upon the violation (e.g., if smoking is detected, a room and all its contents may now require additional cleaning, perhaps even in adjacent rooms that were otherwise unused). In addition, the method 500 may further include adding a surcharge for the violation, and so forth. Thus, these and other modifications are all contemplated within the scope of the present disclosure.

In addition, although not expressly specified above, one or more steps of the method 400 or the method 500 may include a storing, displaying and/or outputting step as required for a particular application. In other words, any data, records, fields, and/or intermediate results discussed in the respective methods can be stored, displayed and/or outputted to another device as required for a particular application. Furthermore, operations, steps, or blocks in FIGS. 4 and 5 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 6 depicts a high-level block diagram of a computing system 600 (e.g., a computing device or processing system) specifically programmed to perform the functions described herein. For example, any one or more components or devices illustrated in FIG. 1, or described in connection with FIGS. 2-5, may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where the hardware processor element 602 may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for determining a violation of at least one rule relating to the use of a premises by at least one user in response to a change in the condition of the premises detected via at least one sensor and/or for determining a maintenance demand of at least one feature of a premises from a change in a condition of the premises detected via at least one sensor, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, the computing system 600 may employ a plurality of hardware processor elements. Furthermore, although only one computing device is shown in FIG. 6, if the method(s) as discussed above is implemented in a distributed or parallel manner for a particular illustrative example, e.g., the steps of the above method(s) or the entire method(s) are implemented across multiple or parallel computing devices, then the computing system 600 of FIG. 6 may represent each of those multiple or parallel computing devices. Furthermore, one or more hardware processor elements (e.g., hardware processor element 602) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 605 for determining a violation of at least one rule relating to the use of a premises by at least one user in response to a change in the condition of the premises detected via at least one sensor and/or for determining a maintenance demand of at least one feature of a premises from a change in a condition of the premises detected via at least one sensor (e.g., a software program comprising computer-executable instructions) can be loaded into memory 604 and executed by hardware processor element 602 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 602) executing the computer-readable instructions relating to the above described method(s) can be perceived as a programmed processor or a specialized processor. As such, the present module 605 for determining a violation of at least one rule relating to the use of a premises by at least one user in response to a change in the condition of the premises detected via at least one sensor and/or for determining a maintenance demand of at least one feature of a premises from a change in a condition of the premises detected via at least one sensor (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:

monitoring, by a processing system including at least one processor, a condition of a premises during a time period via at least one sensor, wherein at least one user is permitted a use of the premises during the time period;

detecting, by the processing system, a change in the condition of the premises during the time period via the at least one sensor;

determining, by the processing system, a violation of at least one rule relating to the use of the premises by the at least one user, wherein the violation is indicated by the change in the condition, wherein the at least one rule comprises a rule defining a restriction on a presence of pets, wherein the change in the condition of the premises comprises a presence of at least one pet, and wherein the determining the violation of the at least one rule comprises determining that at least one pet is present; and generating, by the processing system, an alert of the violation of the at least one rule relating to the use of the premises by the at least one user.

2. The method of claim 1, wherein the at least one rule further comprises a maximum capacity of at least one feature of the premises, wherein the change in the condition of the premises further comprises a presence of a number of people in relation to the at least one feature, and wherein the determining the violation of the at least one rule comprises determining that the number of people exceeds the maximum capacity of the at least one feature.

3. The method of claim 1, wherein the alert is transmitted to at least one of:

a device of an owner of the premises;

a device of a manager of the premises; or a device of the at least one user.

4. The method of claim 1, wherein the at least one sensor comprises at least one of:

a motion sensor;

a location sensor;

a microphone;

a weight sensor;

an air quality sensor;

a temperature sensor;

a humidity sensor; or a radio frequency identification reader.

5. The method of claim 1, wherein the at least one rule further comprises a rule defining a restriction on a movement of at least one item associated with the premises.

6. The method of claim 5, wherein the restriction on the movement of the at least one item associated with the premises comprises a prohibition of a removal of the at least one item from the premises, or a limitation of the movement of the at least one item within the premises.

7. The method of claim 5, wherein the change in the condition of the premises further comprises a movement of the at least one item, and wherein the determining the violation of the at least one rule comprises determining that the movement of the at least one item that is prohibited has occurred or determining that the at least one item has been moved in excess of a limitation.

8. A non-transitory computer-readable medium storing instructions that, when executed by a processing system including at least one processor, cause the processing system to perform operations, the operations comprising:

monitoring a condition of a premises during a time period via at least one sensor, wherein at least one user is permitted a use of the premises during the time period;

detecting a change in the condition of the premises during the time period via the at least one sensor;

determining a violation of at least one rule relating to the use of the premises by the at least one user, wherein the violation is indicated by the change in the condition, wherein the at least one rule comprises a rule defining a restriction on a presence of pets, wherein the change in the condition of the premises comprises a presence of at least one pet, and wherein the determining the violation of the at least one rule comprises determining that at least one pet is present; and generating an alert of the violation of the at least one rule relating to the use of the premises by the at least one user.

9. The non-transitory computer-readable medium of claim 8, wherein the at least one rule further comprises a maximum capacity of at least one feature of the premises, wherein the change in the condition of the premises further comprises a presence of a number of people in relation to the at least one feature, and wherein the determining the violation of the at least one rule comprises determining that the number of people exceeds the maximum capacity of the at least one feature.

10. The non-transitory computer-readable medium of claim 8, wherein the alert is transmitted to at least one of:

a device of an owner of the premises;

a device of a manager of the premises; or a device of the at least one user.

11. The non-transitory computer-readable medium of claim 8, wherein the at least one sensor comprises at least one of:

a motion sensor;

a location sensor;

a microphone;

a weight sensor;

an air quality sensor;

a temperature sensor;

a humidity sensor; or a radio frequency identification reader.

12. The non-transitory computer-readable medium of claim 8, wherein the at least one rule further comprises a rule defining a restriction on a movement of at least one item associated with the premises.

13. The non-transitory computer-readable medium of claim 12, wherein the restriction on the movement of the at least one item associated with the premises comprises a prohibition of a removal of the at least one item from the premises, or a limitation of the movement of the at least one item within the premises.

14. The non-transitory computer-readable medium of claim 12, wherein the change in the condition of the premises further comprises a movement of the at least one item, and wherein the determining the violation of the at least one rule comprises determining that the movement of the at least one item that is prohibited has occurred or determining that the at least one item has been moved in excess of a limitation.

15. An apparatus comprising:

a processing system including at least one processor; and a non-transitory computer-readable medium storing instructions that, when executed by the processing system, cause the processing system to perform operations, the operations comprising:

monitoring a condition of a premises during a time period via at least one sensor, wherein at least one user is permitted a use of the premises during the time period;

detecting a change in the condition of the premises during the time period via the at least one sensor;

determining a violation of at least one rule relating to the use of the premises by the at least one user, wherein the violation is indicated by the change in the condition, wherein the at least one rule comprises a rule defining a restriction on a presence of pets, wherein the change in the condition of the premises comprises a presence of at least one pet, and wherein the determining the violation of the at least one rule comprises determining that at least one pet is present; and generating an alert of the violation of the at least one rule relating to the use of the premises by the at least one user.

16. The apparatus of claim 15, wherein the at least one rule further comprises a maximum capacity of at least one feature of the premises, wherein the change in the condition of the premises further comprises a presence of a number of people in relation to the at least one feature, and wherein the determining the violation of the at least one rule comprises determining that the number of people exceeds the maximum capacity of the at least one feature.

17. The apparatus of claim 15, wherein the alert is transmitted to at least one of:

a device of an owner of the premises;

a device of a manager of the premises; or a device of the at least one user.

18. The apparatus of claim 15, wherein the at least one sensor comprises at least one of:

a motion sensor;

a location sensor;

a microphone;

a weight sensor;

an air quality sensor;

a temperature sensor;

a humidity sensor; or a radio frequency identification reader.

19. The apparatus of claim 15, wherein the at least one rule further comprises a rule defining a restriction on a movement of at least one item associated with the premises.

20. The apparatus of claim 19, wherein the restriction on the movement of the at least one item associated with the premises comprises a prohibition of a removal of the at least one item from the premises, or a limitation of the movement of the at least one item within the premises.

* * * * *